United States Patent [19]

Lythgoe

[11] Patent Number: 5,426,663
[45] Date of Patent: Jun. 20, 1995

[54] GLASS MELTING

[75] Inventor: Stanley Lythgoe, Wigan, United Kingdom

[73] Assignee: Pilkington plc, United Kingdom

[21] Appl. No.: 35,698

[22] Filed: Mar. 23, 1993

[30] Foreign Application Priority Data

Mar. 30, 1992 [GB] United Kingdom ............... 9206928

[51] Int. Cl.6 .................................................. C03B 5/027
[52] U.S. Cl. ........................................ 373/39; 373/40; 373/41
[58] Field of Search ................... 373/39–41; 65/134–136

[56] References Cited

U.S. PATENT DOCUMENTS

| 2,993,079 | 7/1961 | Augsburger | 373/39 |
| 3,961,126 | 6/1976 | Maddux | 373/40 |
| 3,967,046 | 6/1976 | Froberg et al. | 373/40 |
| 3,985,944 | 10/1976 | Maddux | 373/40 |
| 4,282,393 | 8/1981 | Williamson | 373/39 |
| 4,410,997 | 10/1983 | Gell et al. | 373/35 |
| 4,531,218 | 7/1985 | Williamson | 373/39 |
| 4,607,372 | 8/1986 | Martin et al. | 373/41 |

FOREIGN PATENT DOCUMENTS 1080740 8/1981 Germany.
1319060 5/1973 United Kingdom.

OTHER PUBLICATIONS

Glass Industry, May 1991, pp. 15–17.

Primary Examiner—Bruce A. Reynolds
Assistant Examiner—Tu Hoang
Attorney, Agent, or Firm—Howrey & Simon

[57] ABSTRACT

A glass melting tank provides heat in a melting chamber 11 from pairs of electrodes 26, 27 and 28. A three-phase electrical power supply 34 provides power to the electrode pairs and the voltage supplied for the different phase is independently controlled by a power control 33.

11 Claims, 9 Drawing Sheets

GLASS MELTING

The invention relates to glass melting and to a glass melting tank in which heat is applied to melt glass by use of electrical current flowing through a plurality of electrodes.

BACKGROUND OF THE INVENTION

Electrical melting is known in glass furnaces where heat is generated by the Joule effect caused by electrical current flow between pairs of electrodes submerged in molten glass. The normal electrical supply at an industrial site is a high voltage alternating three phase electrical supply which is normally connected to a transformer system to provide power at a desired voltage. Three phase electrical systems are commonly connected to a transformer by use of a star or delta configuration and the output from the secondary windings of such a transformer may be coupled in a closed delta arrangement. Such a system of supplying a three phase power supply using a closed delta system in an electric glass melter is shown in U.S. Pat. No. 4,607,372. In that patent specification electrodes are arranged in rows and a balanced electrical load is achieved on each of the three phases by using a strict geometric pattern for the electrode array. Using such a closed delta system for the three phase supply to the electrodes it is not possible to vary independently the power supplied through each of the different phases of the three phase supply. When the geometric arrangement of electrodes in the array is changed the power distribution in the melter will be varied which may lead to unbalanced loading. It is therefore necessary to maintain a predetermined geometric pattern for the electrode array which may limit variation of furnace design and operation. Furthermore it does not permit local variations in heat distribution if instability should occur during operation.

UK Patent 1319060 and U.S. Pat. No. 4,410,997, show other electrical heating systems used in glass melting where power is derived from a three phase electrical supply. They again require specific geometric symmetry of the electrode arrangements in order to maintain balanced electrical loads.

It is an object of the present invention to provide an electrical heating system for use in a glass melting furnace using a three phase AC supply wherein the electrical power supplied between selected pairs of electrodes may be adjusted to achieve a desired heat distribution.

SUMMARY OF THE INVENTION

The invention provides a method of melting glass in a melting chamber of a glass melting tank by electrical heating from an array of electrodes immersed in molten glass in the melting chamber, which method comprises connecting a three phase AC electrical supply to a primary circuit of a transformer, forming in secondary circuits three single phase outputs with a 120 phase difference between each output, connecting each of said outputs respectively to a selected pair of pairs of electrodes in said array and adjusting the voltage in one of said outputs independently of the voltage in the other outputs to obtain a desired heating balance in said array of electrodes.

The invention is particularly applicable for use in melting glass in a cold top melter, wherein batch material is supplied to the melting chamber to form a continuous blanket of solid batch material over molten glass in the chamber.

The invention also provides a method of melting glass in a melting chamber of a glass melting tank by electrical heating from an array of electrodes immersed in molten glass in the melting chamber which method comprises providing a first single phase electrical supply to a selected pair or pairs of electrodes in the array, providing a second single phase electrical supply of different phase from said first electrical supply to one or more other selected pairs of electrodes in the array, providing a third single phase electrical supply of different phase from both said first and second electrical supplies to one or more other selected pairs of electrodes in the array and effecting a voltage control of at least one of said electrical supplies independently of the voltage supplied by the others.

Preferably electricity is provided to selected pairs of electrodes in the array from a respective one of three electrical supply circuits each of single phase with a 120 phase difference between each circuit, the voltage of each circuit being separately controlled.

Preferably an AC three phase high voltage supply is connected to a transformer having three secondary circuits which provide respectively said three electrical supply circuits.

Preferably each secondary circuit includes an independently operable voltage adjusting circuit which is adjusted to obtain a desired voltage for that circuit independently of the voltage in the other secondary circuits thereby providing a desired heating balance from said electrodes.

The invention also provides a glass melting tank having a melting chamber with an array of electrodes for heating glass in the chamber and a power supply connected to said electrodes, said power supply comprising a three-phase AC supply, a transformer having a primary circuit for coupling to said three phase supply and secondary circuits for generating three single phase outputs with a 120° phase difference between each output, and voltage control circuitry in at least one secondary circuit whereby voltage of the output from said secondary circuit may be varied independently of the voltage of the other outputs.

Preferably said secondary circuits comprise three output circuits of respective phases, each of said output circuits including voltage control circuitry operable independently of the other output circuits.

Preferably the array of electrodes comprises a plurality of rows of electrodes mounted at a base of the chamber and extending upwardly from the base.

In a glass melting tank the melting chamber may include batch feed apparatus for supplying batch material in solid form to the surface of molten glass in the melting chamber and thereby form a blanket of unmelted batch material over the molten glass.

It will be seen that use of the invention may permit power control to electrodes in a glass melting furnace so as to allow selection of any desired geometry of a furnace chamber containing the electrodes and/or the geometry of the electrode array used in the furnace. Furthermore the invention may be used to give selective control of heat distribution within a chamber of a glass melting furnace from use of an electrode array. In this way power distribution to the electrodes may be controlled so as to give a uniform heat distribution over part or all of the chamber of the glass furnace or alternatively power may be controlled in such a way as to give selectively greater power dissipation in selected regions of the chamber. The variation of power dissipation over the electrode array may be controlled in a manner so as to control the convective currents of molten glass within the chamber.

DESCRIPTION OF THE PREFERRED EMBODIMENTS

Figure 1:
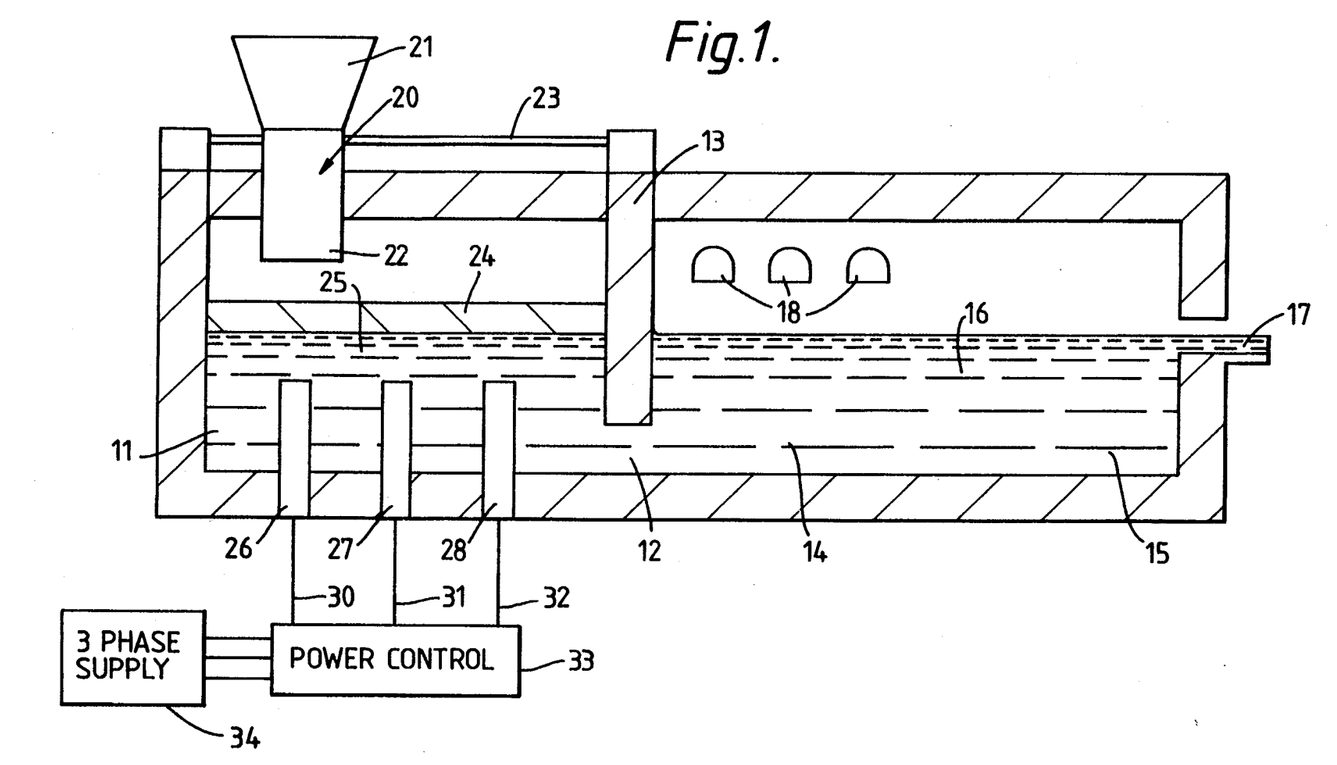
FIG. 1 is a schematic section through a glass furnace in accordance with the present invention.

The glass furnace shown in FIG. 1 may be used to form molten glass from solid batch material and supply molten glass in a suitably refined and thermally conditioned state for feeding to a float process. In this example the glass furnace comprises a melting chamber 11 communicating through a throat 12 at the bottom of a refractory wall 13 with a refining zone 14 leading to a thermal conditioning zone 15 prior to molten glass 16 passing through an outlet 17 which may be connected to the input of a float glass forming process. The furnace is formed of refractory walls, base and roof and heat is applied in the refining zone 14 through gas fired ports 18 to heat the glass to a sufficient temperature in the refining zone 14 to effect refining in a conventional manner.

In this particular example solid batch forming material is supplied to the melting zone 11 through a feed system 20 which consists of a batch holding hopper 21 mounted on a movable carriage 22 driven in reciprocating manner along guide rails 23 so that batch material is evenly distributed to form a continuous blanket 24 of unmelted batch material covering the entire surface of molten glass 25 in the melting chamber 11. Mounted in the base of the melting chamber 11 are three rows of vertical electrodes 26, 27 and 28 projecting upwardly from the base of the melting zone terminating well below the position of the blanket 24. The electrodes 26, 27 and 28 receive power respectively from circuits 30, 31 and 32 from a power control system 33 which in turn is fed with three phase AC high voltage supply from a supply 34.

Electrical current is caused to flow through the molten glass between adjacent electrodes forming a conducting pair so that heating is caused by the Joule effect. The use of direct heating by electrodes immersed in the molten glass together with the high thermal insulation value of the blanket 24 and refractory structure of which the furnace is made, result in a high efficiency of energy utilisation.

It is important to avoid operational instability in the melting chamber 11 which would limit the furnace load capability and also produce non-uniform electrode wear. It is therefore important to be able to control the heat distribution achieved by current flow between the electrodes in the electrode array in the melting chamber 11. Uneven heating may cause unwanted temperature variations in the molten glass thereby affecting the conductivity of the glass causing further instability in the heat distribution within the melting chamber. In addition to electrode wear this may cause uneven melting of the blanket 24 above the molten glass leading to hot spots where the blanket may be melted to cause gaps or holes in the blanket. This in turn would cause loss of heat from certain regions of the melting chamber leading to yet further instability in the desired conditions in the melting chamber.

To achieve a stable melting and a desired heat distribution pattern within the melting chamber 11 the examples described provide for selective control of power supplied between different pairs of electrodes so as to achieve the correct heat distribution within the melting chamber 11. The power control is effected by use of the circuits shown in FIG. 2.

Figure 2:
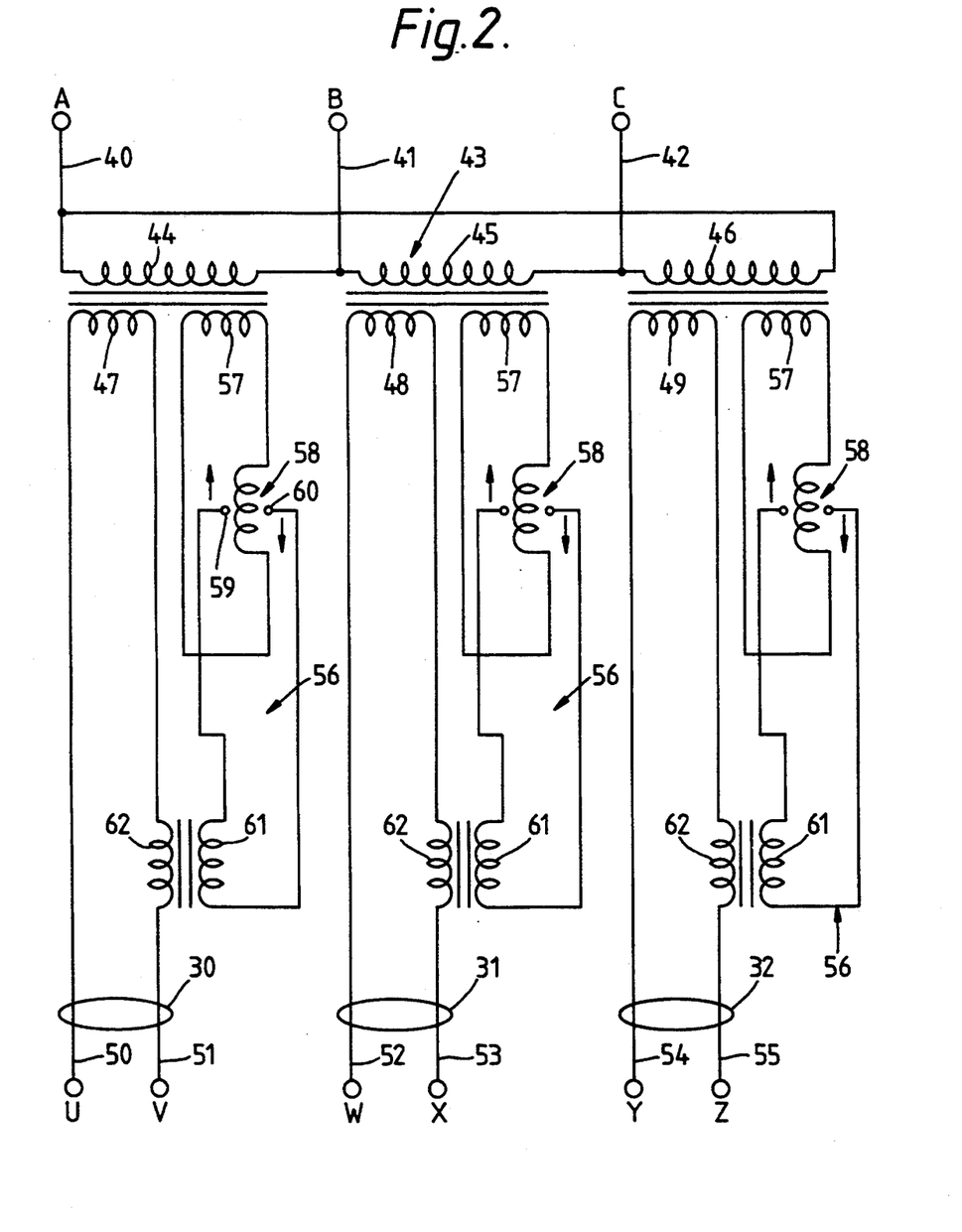
FIG. 2 shows the power control system used in FIG. 1.

The three phase AC supply 34 of FIG. 1 provides, as shown in FIG. 2, a conventional high voltage three phase output on three lines 40, 41 and 42 which are connected in a closed delta arrangement to the primary circuit of a transformer 43. Lines 40, 41 and 42 provide respective AC signals of differing phases each of the phases differing by 120°. The primary circuit of transformer 43 has one primary coil 44 connected between lines 40 and 41. A second primary coil 45 is connected across lines 41 and 42 and a third primary coil 46 is connected across lines 42 and 40. The secondary circuit of the transformer 43 has three single phase secondary circuits 47, 48 and 49 inductively coupled with circuits 44, 45 and 46 respectively. Circuit 47 is arranged to provide a first transformer output marked 30 in FIG. 1 and formed by the two lines 50 and 51 in FIG. 2. Circuit 48 similarly provides a second output marked 31 in FIG. 1 and formed by lines 52 and 53 in FIG. 2. Circuit 49 provides a third output marked 32 in FIG. 1 and formed by lines 54 and 55 in FIG. 2. Each of the outputs 30, 31 and 32 is a single phase output corresponding to the phase angles of lines 40, 41 and 42 respectively, with a 120° phase difference between each output. In this way line 40 provides a positive signal between 0° and 180°, line 41 provides a positive signal between 120° and 300° and line 42 provides a positive signal between 240° and 60°. The voltage of each of the outputs 30, 31 and 32 is independently controllable by a voltage control circuit 56. Each of the secondary windings 47, 48 and 49 has a similar voltage control circuit 56 and only one will be described in detail. A winding 57 is inductively coupled with the respective part of the primary windings 44 or 45 or 46. Winding 57 is connected in series in a closed loop with a variable transformer 58. The transformer 58 has two adjustable tap off points 59 and 60 which are connected to one coil 61 of a voltage transformer having its other coil 62 connected in series with the secondary winding 47 or 48 or 49. By adjustment of the taps 59 and 60 on the transformer 58 the voltage transformer formed by coils 61 and 62 adjusts the output voltage of output 30 or 31 or 32 quite independently of the other two outputs. It is therefore seen that the circuit 56 acts as an induction voltage regulator linked through coil 62 in series with the main transformer secondary winding on each of the three single phase outputs. The unit provides an efficiency factor of greater than 94% and does not introduce distortion into the sinusoidal wave nor any DC components. The provision of the voltage control circuits 56 allows control of the voltage on the individual phases which can be connected to selected electrode pairs so that electrode positions within the glass melting furnace can be determined by furnace design considerations as well as electrical design considerations thereby giving greater freedom to the overall design of the glass furnace.

Figure 3:
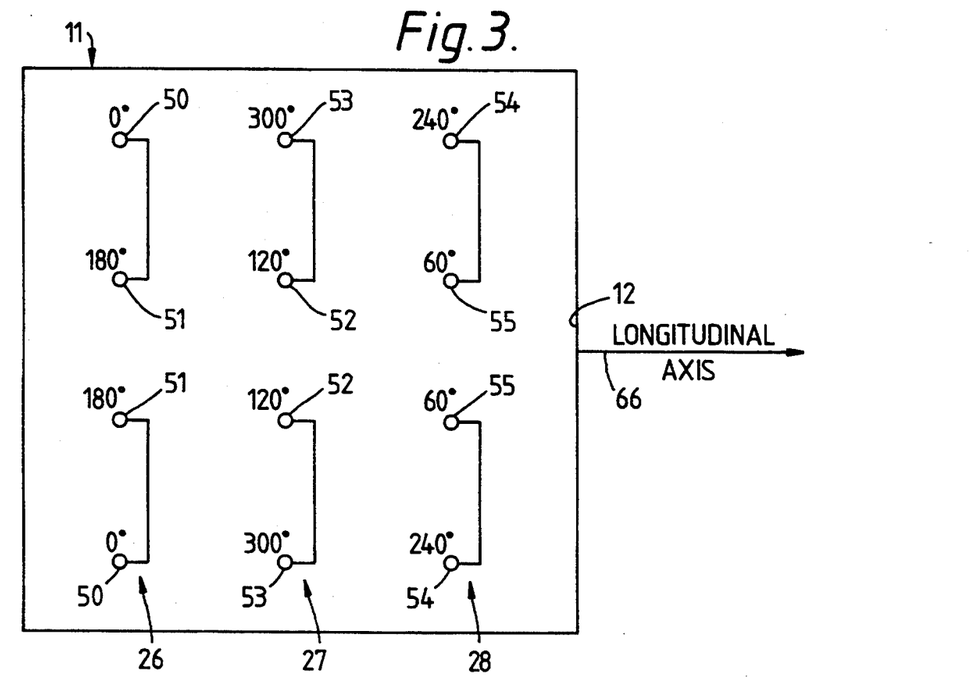
FIG. 3 shows one electrode array in the melting chamber of FIG. 1.
Figure 4:
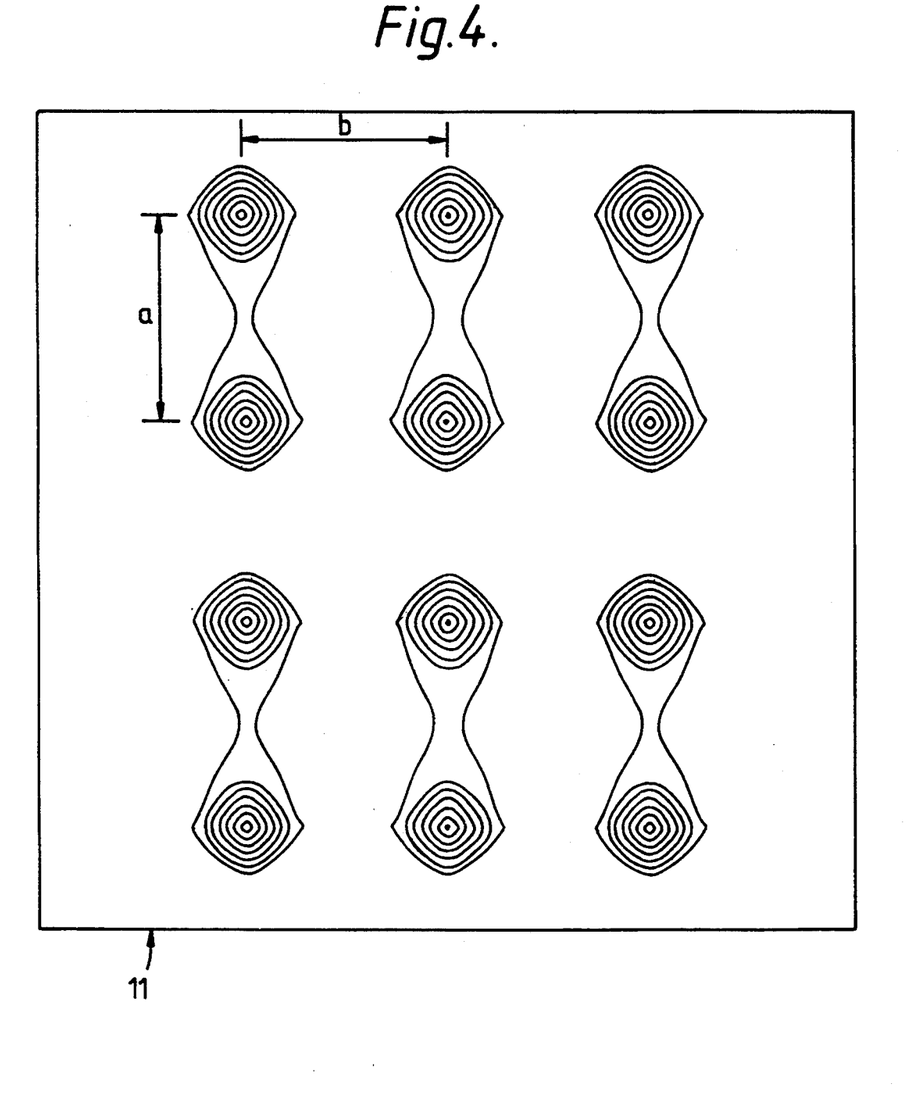
FIG. 4 shows power contours for operation of the electrode array of FIG. 3.

In the particular example shown in FIG. 3 four electrodes are provided in each of the rows 26, 27 and 28. A longitudinal axis of the melting zone 11 is indicated by the arrow 66 which shows the direction of flow of molten glass towards the throat 12 of FIG. 1. The four electrodes of each row are arranged in two pairs the electrodes of each pair are coupled respectively to the two lines of each of the outputs 30, 31 or 32 shown in FIG. 2. In FIG. 3 the electrode positions are marked by the reference numerals of the lines of FIG. 2 to which they are connected. It can therefore be seen that the two electrodes in each row which are nearest the longitudinal axis 66 are connected to the same supply line. In this particular example the separation a between electrodes in the same row is equal to the separation b between aligned electrodes in adjacent rows. The power dissipation pattern which is achieved by supplying the same voltage in all three phases to the electrodes of FIG. 3 is shown in FIG. 4. It can be seen from FIG. 4 that the power contours are the same for each pair of electrodes thereby giving similar heat distribution from the electrodes.

Figure 5:
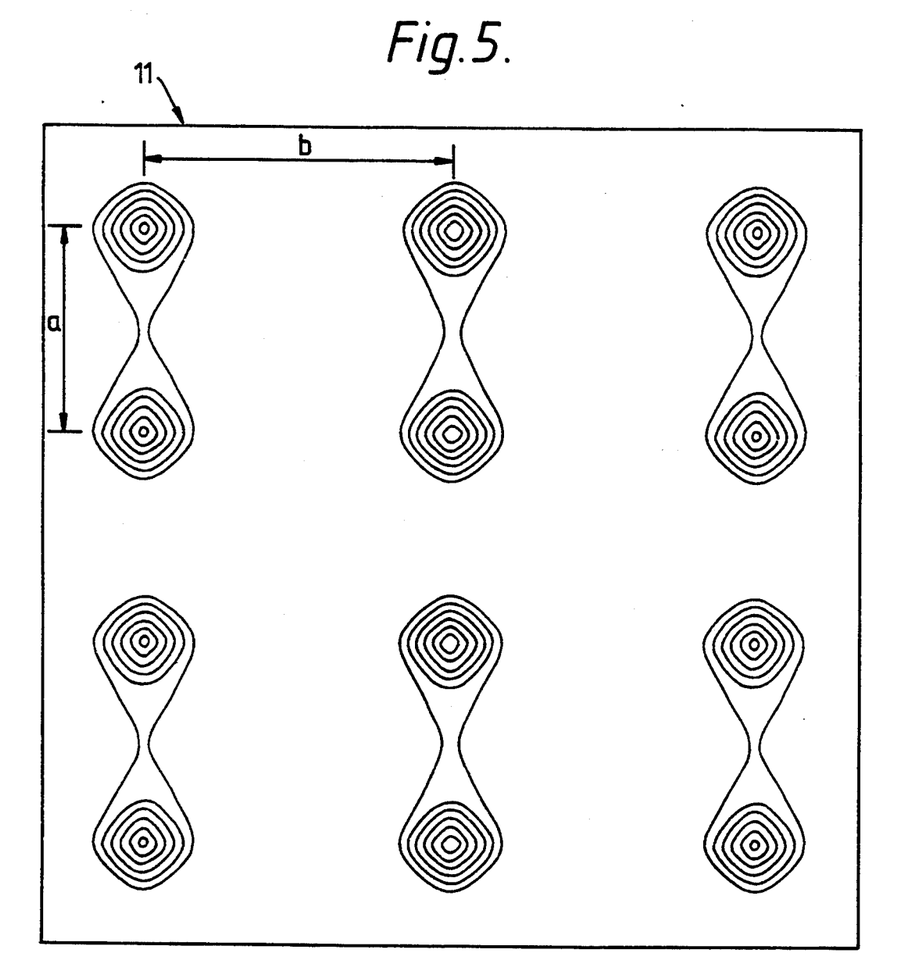
FIG. 5 shows power contours for a modified form of the electrode array shown in FIG. 3.

FIG. 5 shows a power contour diagram similar to FIG. 4 but for a modified electrode array. In both Figures the outer contour represents a value of 0.5 with a change in power value of 0.5 on each successive contour leading to an inner contour of 3.5. In this case 12 electrodes are used as in FIG. 3 but in this case the distance b between aligned electrodes in adjacent rows is 1.5×a where a is the distance between adjacent electrodes in any one of the rows 27 and 28. It will be seen that the power contours are substantially the same as shown in FIG. 4 thereby indicating that the geometry of the glass melting furnace and the elctrode array can be varied by use of the present invention while still obtaining a desired power dissipation and heat distribution.

The geometry of the glass melting furnace together with the layout of the electrode array and the manner in which the three single phase supplies 30, 31 and 32 are connected to the electrodes can be varied. In particular the connection of the different supplies 30, 31 and 32 to selected electrode pairs may be determined by the extent of localised electrical interaction desired between the electrode pairs together with the circuit resistance of the molten glass and the extent to which glass flows in the melting zone need to be influenced by power dissipation patterns. In the example shown in FIGS. 3, 4 and 5 there is minimum interaction between electrodes outside any particular pair which are connected to the same phase supply.

Figure 6:
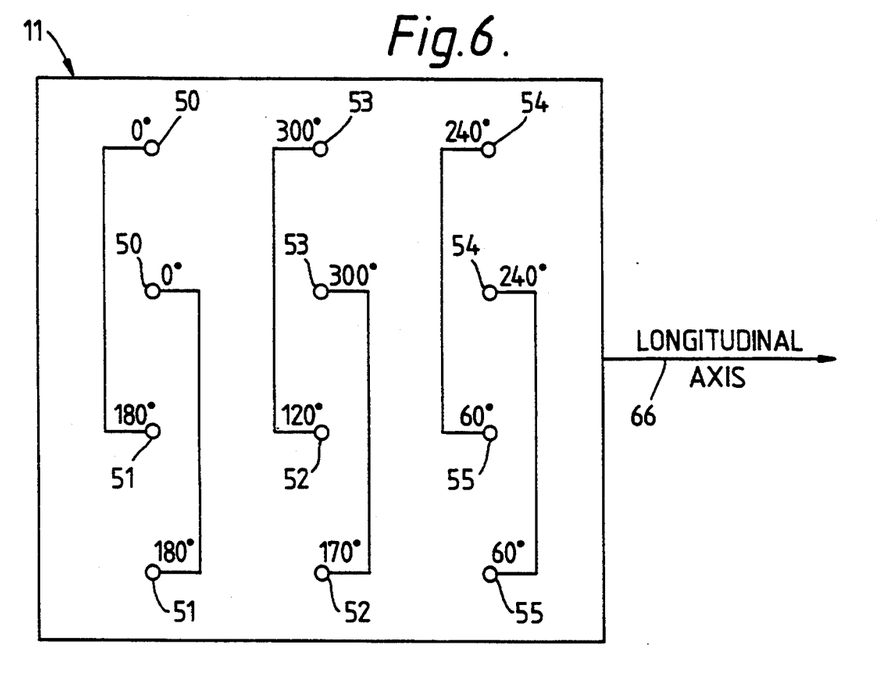
FIG. 6 shows a further example of an electrode array which may be used in the melting chamber of FIG. 1.
Figure 7:
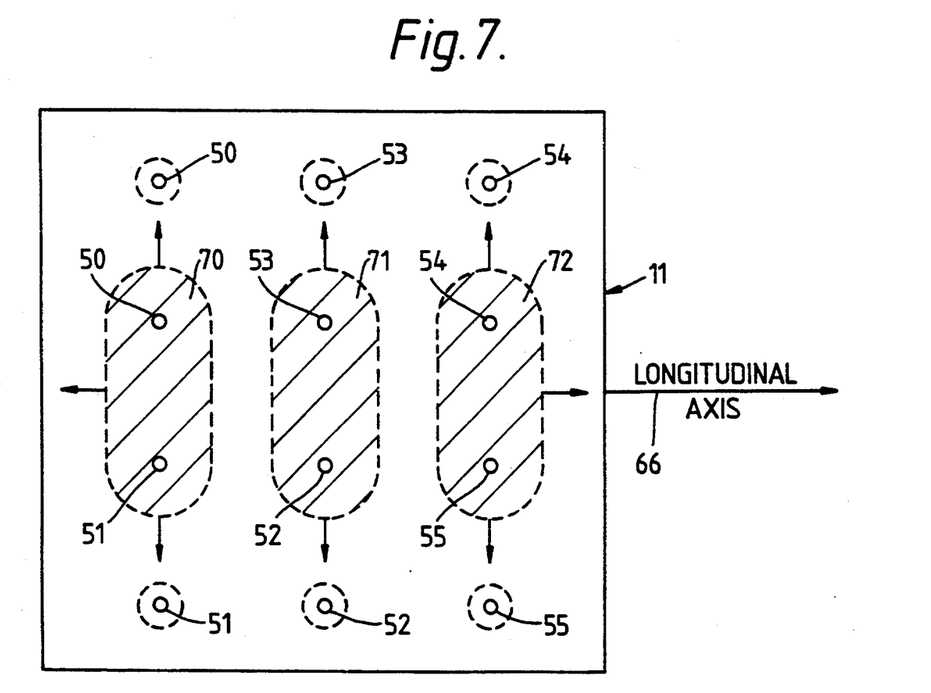
FIG. 7 shows a power dissipation pattern for use of the electrode array shown in FIG. 6.

By rearranging the connection of the three different supply circuits 30, 31 and 32 to the various electrode pairs it is possible to redistribute the localised power dissipation pattern without increasing the total power input or without effecting the balanced power input to the primary circuit of the power control 33. FIG. 6 illustrates an electrode arrangement similar to FIGS. 3 and 4 but the connection of the three supply circuits 30, 31 and 32 is changed so that in each of the rows 26, 27 and 28 alternate electrodes are connected to a common supply circuit. This means that in any one row the first and third electrodes are connected to the same supply circuit and the second and fourth electrodes are connected to a different common supply circuit. The supply lines connected to each of the electrodes are indicated by reference numerals corresponding to the power supply lines of FIG. 3 and it will therefore be seen that the two outer electrodes at opposite ends of each row are connected to the same supply line thereby minimising interelectrode action towards the sides of the melting zone and concentrating the current flow between the two central electrodes of each row. This causes a power dissipation pattern of the type shown in FIG. 7 where the major power dissipation occurs in the regions 70, 71 and 72 all lying centrally along the longitudinal axis 66.

Figure 8:
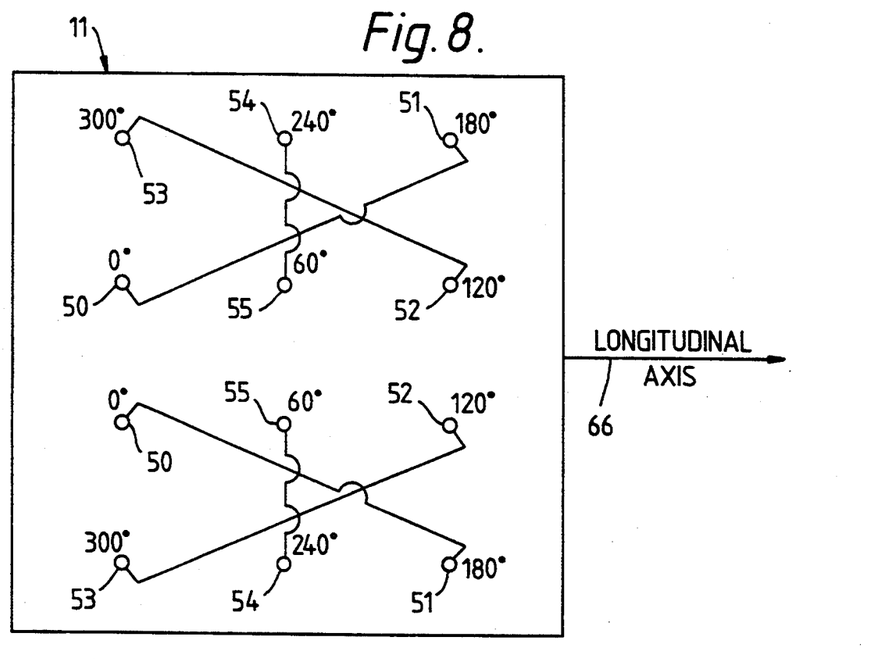
FIG. 8 shows a further alternative electrode array which may be used in the melting chamber of FIG. 1.
Figure 9:
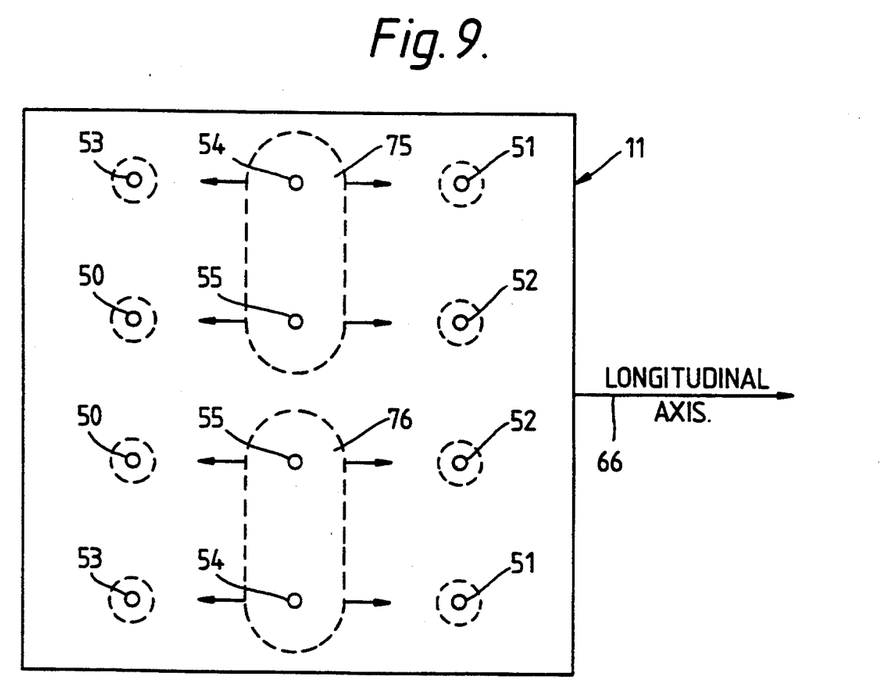
FIG. 9 shows the power dissipation pattern for use of the electrode array of FIG. 8.

FIGS. 8 and 9 shows a further alternative arrangement where the electrode array is the same as shown in FIGS. 3 and 4 but the connections of the three power supply circuits 30, 31 and 32 are different. In this case the central electrodes in each of rows 26 and 28 are coupled diagonally to outer electrodes in the other row whereas in row 27 the central electrodes are connected to the outer electrodes in the same row, the two central electrodes being connected to the same power supply line. This causes the main current to flow between the middle and outer electrodes in the central row 27 thereby causing major power dissipation in regions 75 and 76 as illustrated in FIG. 9 which lie across a transverse axis of the melting zone perpendicular to the longitudinal axis 66. It will be appreciated that in FIGS. 7 and 9 the regions showing maximum power dissipation will of course increase the temperature of molten glass in those regions causing the strongest convection flow of glass in an upward direction. In this way it is possible to arrange the coupling of the three different phases of power supply to selected pairs of electrodes so as to control the location of the strongest upward convection flows in the glass furnace.

Figure 10:
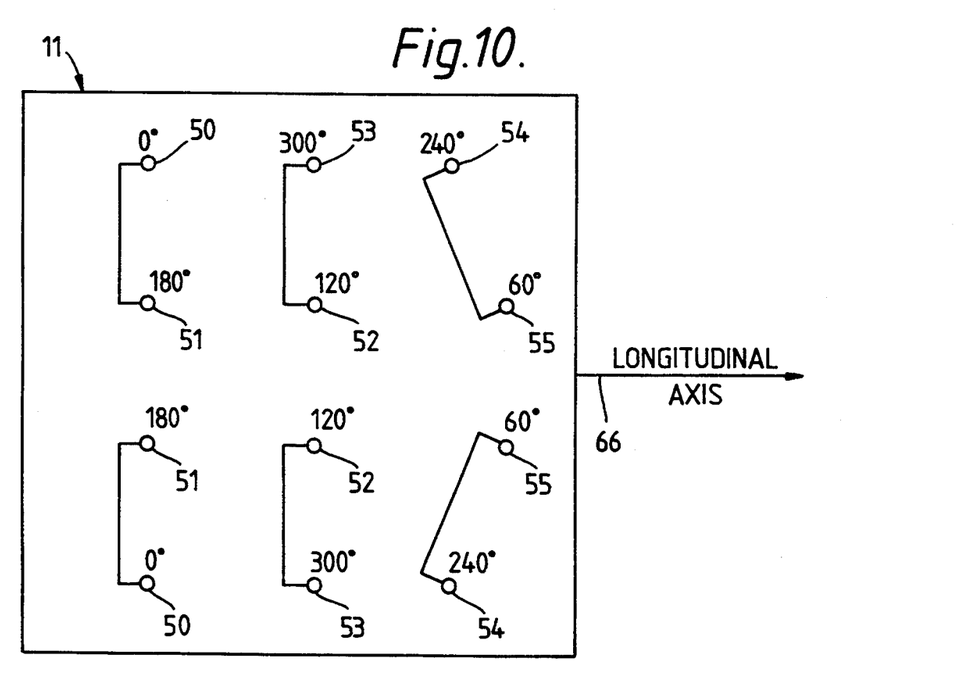
FIG. 10 shows yet another electrode array which may be used in the melting chamber of FIG. 1.

A further modification is shown in FIG. 10 where twelve electrodes generally similar to those shown in FIGS. 3 and 4 are rearranged so that the electrodes in row 28 no longer form a straight line across the melting chamber. The electrodes in row 28 form two pairs inclined forwardly towards the throat 12. This enables power to be delivered in the region where there is a strong natural downflow into the throat 12. In this way the tendency for newly melted glass to short circuit the main furnace flows can be controlled due to the strong upward flow which will be caused by the increased power input adjacent the throat 12. The connections of the power supplies used to FIG. 10 are as shown by the reference numerals corresponding to the power lines of FIG. 3.

Figure 11:
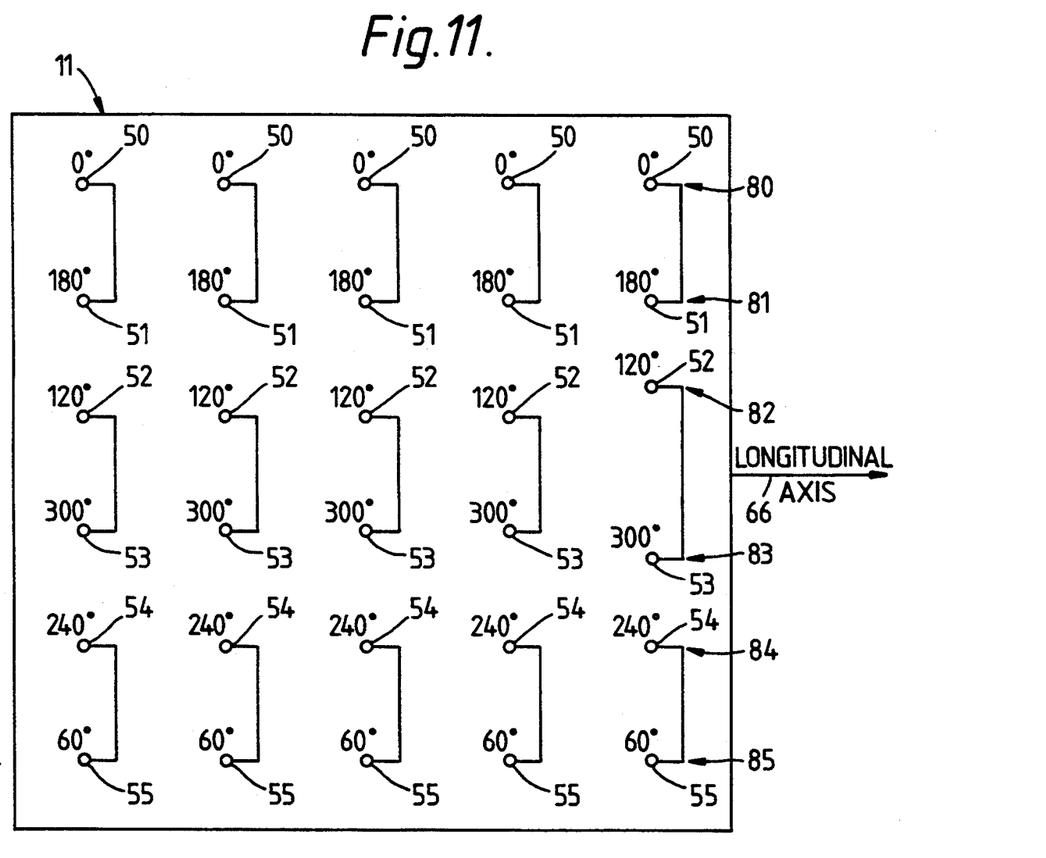
FIG. 11 shows a further alternative electrode array which may be used in the melting chamber of FIG. 1.

The invention is not limited to the details of the foregoing examples. Although the previous examples use an array of twelve electrodes in the melting chamber a twenty four electrode array is shown in FIG. 11. The connections of these electrodes to the power supply lines are indicated by reference numerals corresponding to those of the single phase lines shown in FIG. 3. In this particular example all electrodes in longitudinal line 80 are connected to line 50. All electrodes in longitudinal line 81 are connected to line 51. All electrodes in longitudinal line 82 are connected to line 52. All electrodes in longitudinal line 83 are connected to line 53. All electrodes in longitudinal line 84 are connected to line 54 and all electrodes in longitudinal line 85 are connected to line 55. The two electrodes in lines 82 and 83 which are nearest the throat 12 have a greater separation along the row direction so as to provide greater power dissipation on the lateral sides of the throat.

Figure 12:
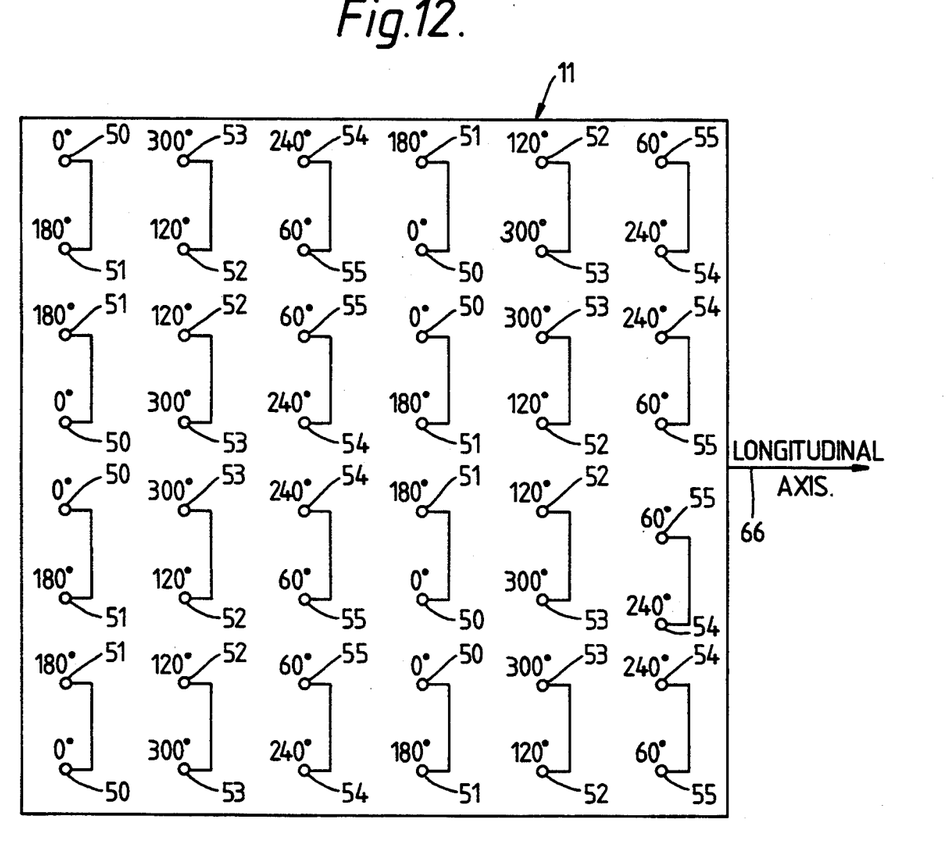
FIG. 12 shows a further electrode array which may be used in the melting chamber of FIG. 1.

An electric melting furnace of the type described above can be extended as desired to produce greater load capability in a larger furnace. An example in shown in FIG. 12 where the electrode array is extended to include forty eight electrodes having connections to the supply lines of FIG. 2 as indicated.

It will therefore be seen that by use of the present invention the geometry of the melting chamber and the electrode array can be modified as desired while still controlling the heat dissipation within the melting chamber. This allows melting chambers which have a dimension in the direction of the longitudinal axis 66 greater than the width in the transverse direction.

In FIG. 1 the electrodes 26–28 provide the heat input to the melting chamber. However in some embodiments the electrodes may be used as a boost heating arrangement which supplies additional heat to that provided from other sources, such as gas or oil firing including additional ports, such as ports 18, in the melting chamber.

I claim:

1. A method of melting glass in a melting chamber of a glass melting tank by electrical heating from an array of electrode pairs immersed in molten glass in the melting chamber, which method comprises connecting a three phase AC electrical supply to a primary circuit of a transformer having coupled primary and secondary circuits, said second circuits each providing a respective output voltage, forming in said secondary circuits three single phase outputs with a 120 phase difference between each output, connecting said secondary circuits to said electrode pairs with each of said electrode pairs in said array being connected only to one of said secondary circuits and adjusting the output voltage of one of said secondary circuits independently of the output voltage of the other secondary circuits to obtain a desired heating balance in said array of electrode pairs.

2. A method according to claim 1 for use in melting glass in a cold top melter, wherein batch material is supplied to the melting chamber to form a continuous blanket of solid batch material over molten glass in the chamber.

3. A method of melting glass in a melting chamber of a glass melting tank by electrical heating from an array of electrode pairs immersed in molten glass in the melting chamber which method comprises providing a first single phase electrical supply to a first electrode pair in the array, providing a second single phase electrical supply of different phase from said first single phase electrical supply to a second electrode pair in the array, providing a third single phase electrical supply of phase different from both said first and second single phase electrical supplies to a third electrode pair in the array and effecting a voltage control of at least one of the first second and third single phase electrical supplies independently of the others, each electrode pair being connected only to one of the first, second and third single phase electrode supplies.

4. A method according to claim 3 in which a 120 phase difference is provided between each of said first second and third single phase electrical supplies, and voltage control of each of said first second and third single phase electrical supplies is effected separately.

5. A method according to claim 4 in which an AC three phase high voltage supply is connected to a transformer having three secondary circuits which provide respectively said three electrical supply circuits.

6. A method according to claim 5 in which each secondary circuit includes an independently operable voltage adjusting circuit which is adjusted to obtain a desired voltage for that circuit independently of the voltage in the other secondary circuits thereby providing a desired heating balance from said electrodes.

7. A glass melting tank having a melting chamber with an array of electrodes for heating glass in the chamber and a power supply connected to said electrodes, said power supply comprising a three-phase AC supply, a transformer having a primary circuit for coupling to said three phase AC supply and secondary circuits for generating three single phase outputs with a 120° phase difference between each output, and voltage control circuitry in at least one secondary circuit whereby voltage of the output from said at least one secondary circuit is variable independently of the voltage of the other outputs, said electrodes being arranged in pairs with each of said pairs being connected to only one of said secondary circuits.

8. A glass melting tank according to claim 7 in which said secondary circuits comprise three output circuits of respective phases, each of said output circuits including voltage control circuitry operable independently of the other output circuits.

9. A glass melting tank according to claim 7 wherein the array of electrodes comprises a plurality of rows of electrodes mounted at a base of the chamber and extending upwardly from the base.

10. A glass melting tank according to claim 7 wherein said melting chamber includes batch feed apparatus for supplying batch material in solid form to the surface of molten glass in the melting chamber and thereby form a blanket of unmelted batch material over the molten glass.

11. A glass melting tank according to claim 7 in which said tank includes heating devices in addition to said electrode pairs for applying heat to the tank.

* * * * *